United States Patent
Guo et al.

(10) Patent No.: US 11,822,221 B2
(45) Date of Patent: Nov. 21, 2023

(54) LIGHT SOURCE SYSTEM AND PROJECTION APPARATUS

(71) Applicant: APPOTRONICS CORPORATION LIMITED, Guangdong (CN)

(72) Inventors: Zuqiang Guo, Guangdong (CN); Ning Lu, Guangdong (CN); Yi Li, Guangdong (CN)

(73) Assignee: APPOTRONICS CORPORATION LIMITED, Guangdong (CN)

( * ) Notice: Subject to any disclaimer, the term of this patent is extended or adjusted under 35 U.S.C. 154(b) by 107 days.

(21) Appl. No.: 17/420,509

(22) PCT Filed: Dec. 23, 2019

(86) PCT No.: PCT/CN2019/127272
§ 371 (c)(1),
(2) Date: Jul. 2, 2021

(87) PCT Pub. No.: WO2020/140780
PCT Pub. Date: Jul. 9, 2020

(65) Prior Publication Data
US 2022/0082915 A1    Mar. 17, 2022

(30) Foreign Application Priority Data

Jan. 3, 2019  (CN) .......................... 201910005627.9

(51) Int. Cl.
*G03B 21/20* (2006.01)
*G02B 26/00* (2006.01)
*G02B 27/14* (2006.01)

(52) U.S. Cl.
CPC ......... *G03B 21/204* (2013.01); *G02B 26/008* (2013.01); *G02B 27/141* (2013.01);
(Continued)

(58) Field of Classification Search
CPC .............. G03B 21/204; G03B 21/2066; G03B 21/2073; G03B 21/208; G03B 21/206; G03B 33/08; G02B 26/008; G02B 27/141
See application file for complete search history.

(56) References Cited

U.S. PATENT DOCUMENTS

| 11,126,073 B2* | 9/2021 | Jao ..................... G03B 21/2013 |
| 2012/0242912 A1* | 9/2012 | Kitano ..................... F21V 9/08 362/19 |

(Continued)

FOREIGN PATENT DOCUMENTS

| CN | 202109406 | 1/2012 |
| CN | 102418907 | 4/2012 |

(Continued)

OTHER PUBLICATIONS

Chinese Office Action (Application No. 201910005627.9) dated Feb. 15, 2022, (pp. 1-16).

(Continued)

*Primary Examiner* — Magda Cruz
(74) *Attorney, Agent, or Firm* — Nixon Peabody LLP; Jeffrey L. Costellia

(57) ABSTRACT

Provided is a light source system, including: an excitation light source for emitting excitation light; a wavelength conversion device provided with a conversion layer which is used to perform wavelength conversion on at least a portion of the excitation light to obtain stimulated light, and to exit the stimulated light and the unconverted excitation light; and a dichroic assembly which is used to guide the stimulated light exited from the conversion layer to propagate along the second optical path, and finally to exit from the light source system along the exit optical path, and to guide at least a portion of the unconverted excitation light exited from the conversion layer to transmit on a path, which is not the exit (Continued)

optical path. Further provided is a projection device comprising the above light source system.

19 Claims, 12 Drawing Sheets

(52) U.S. Cl.
CPC ....... *G03B 21/208* (2013.01); *G03B 21/2066* (2013.01); *G03B 21/2073* (2013.01)

(56) References Cited

U.S. PATENT DOCUMENTS

| | | | | |
|---|---|---|---|---|
| 2013/0258639 | A1* | 10/2013 | Hu | G03B 21/2066 |
| | | | | 362/84 |
| 2013/0278902 | A1* | 10/2013 | Chen | G03B 21/2066 |
| | | | | 353/31 |
| 2015/0267880 | A1* | 9/2015 | Hadrath | F21K 9/64 |
| | | | | 362/84 |
| 2015/0323861 | A1* | 11/2015 | Saitou | G03B 21/2013 |
| | | | | 353/31 |
| 2015/0346594 | A1 | 12/2015 | Shimizu et al. | |
| 2015/0354787 | A1* | 12/2015 | Chang | H04N 9/3158 |
| | | | | 427/164 |
| 2017/0075203 | A1* | 3/2017 | Cheng | H04N 9/3158 |
| 2017/0199451 | A1* | 7/2017 | Akiyama | G02B 27/0961 |
| 2018/0024426 | A1* | 1/2018 | Chen | H04N 9/3158 |
| | | | | 362/84 |
| 2019/0171094 | A1* | 6/2019 | Hu | G03B 21/2066 |
| 2019/0346752 | A1* | 11/2019 | Pan | G03B 21/204 |
| 2019/0354001 | A1 | 11/2019 | Tsai et al. | |
| 2021/0033953 | A1* | 2/2021 | Guo | G03B 21/2013 |

FOREIGN PATENT DOCUMENTS

| | | |
|---|---|---|
| CN | 104820334 | 8/2015 |
| CN | 204856019 | 12/2015 |
| CN | 206193432 | 5/2017 |
| CN | 206610072 | 11/2017 |
| CN | 206671745 | 11/2017 |
| CN | 206819040 | 12/2017 |
| CN | 206863465 | 1/2018 |
| CN | 107688272 | 2/2018 |
| CN | 107703705 | 2/2018 |
| CN | 207457687 | 6/2018 |
| CN | 108267914 | 7/2018 |
| CN | 108572497 | 9/2018 |
| CN | 108572498 | 9/2018 |
| CN | 207851495 | 9/2018 |
| CN | 108931878 | 12/2018 |
| CN | 108931879 | 12/2018 |
| CN | 108931880 | 12/2018 |
| CN | 208188569 | 12/2018 |
| CN | 110501867 | 11/2019 |
| CN | 110874004 | 3/2020 |
| EP | 3598229 | 1/2020 |
| JP | 2016-173390 | 9/2016 |
| WO | WO-2018-166120 | 9/2018 |
| WO | WO-2018-214288 | 11/2018 |
| WO | WO-2018-214333 | 11/2018 |

OTHER PUBLICATIONS

International Search Report for PCT/CN2019/127272, dated Mar. 12, 2020.

\* cited by examiner

A-A

LIGHT SOURCE SYSTEM AND PROJECTION APPARATUS

TECHNICAL FIELD

The present disclosure relates to the field of display technology, and in particular, to a light source system and a projection apparatus.

BACKGROUND

This section is intended to provide background or context for specific embodiments of the present disclosure stated in the claims. The description herein is not considered as the related art although it is included in this section.

A laser-fluorescent hybrid light source is widely used in cinema projectors, engineering projections, business projections, and laser TVs due to its advantages such as long service life, low cost and high brightness, as well as good display effect.

In a projection device of a monolithic spatial light modulator, sequential light combination is commonly performed using rotatable color wheel methods. Common color wheel methods include a dual-color wheel method in which a phosphor wheel and a filter wheel are included and a single-color wheel method in which a single color wheel is combined by the phosphor wheel and the filter wheel.

SUMMARY

According to one aspect of the present disclosure, there is provided a light source system. The light source system includes an excitation light source configured to emit excitation light, a wavelength conversion device provided with a conversion layer, and a dichroic assembly. The conversion layer is configured to perform wavelength conversion on at least part of the excitation light to obtain excited light and emit the excited light and unconverted excitation light of the excitation light. The dichroic assembly is configured to guide the excited light emitted from the conversion layer to propagate along a second optical path, so that the excited light is finally emitted from the light source system along a light-emitting optical path, wherein the dichroic assembly is also configured to guide the at least part of the unconverted excitation light emitted from the conversion layer to be transmitted on an optical path, which is not the light-emitting optical path.

According to a second aspect of the present disclosure, there is provided a projection apparatus including the light source system as described above.

In the wavelength conversion device of the light source system according to embodiments of the present disclosure, the excitation light of the excited light that has not been converted by the wavelength conversion device is filtered by the dichroic assembly. Thus, it is beneficial to improve the accuracy of colors of the light emitted from the light source system, thereby ensuring that the display effect of the projection apparatus employing the light source system is improved and the miniaturization of the projection apparatus is realized.

BRIEF DESCRIPTION OF DRAWINGS

In order to more clearly describe technical solutions of the embodiments/implementations of the present disclosure, accompanying drawings described in the description of the embodiments/implementations will be briefly introduced hereinafter. It is apparent that the accompanying drawings in the following description are some embodiments/implementations of the present disclosure. Other drawings may be obtained without inventive steps based on these drawings by those skilled in the art.

Figure 1:
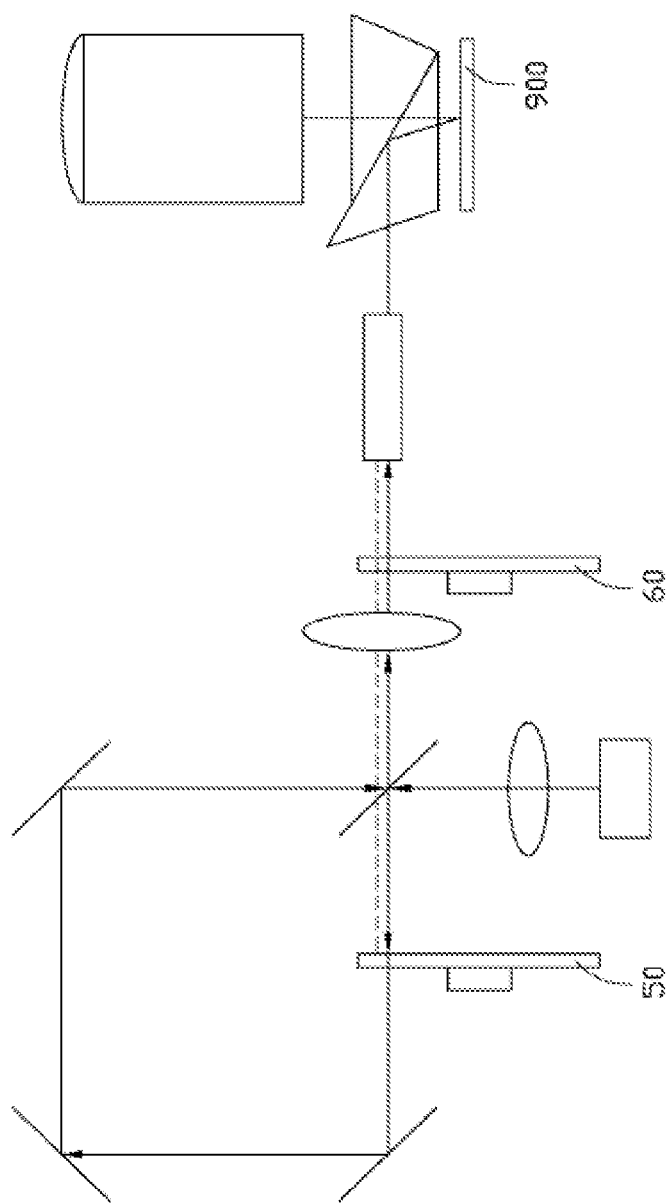
FIG. 1 is a schematic structural view of a dual-color wheel method.

REFERENCE SIGNS LIST phosphor wheel 50
filter wheel 60
color wheel 70
phosphor region 71
filter region 72
light source system 100, 200, 300, 400, 500
excitation light source 110
supplemental light source 220, 320
first dichroic element 130, 430
collecting lens group 140
wavelength conversion device 150, 250, 350, 550
driving unit 151
substrate 152, 252, 352, 552
first region 252*a*
second region 252*b*
conversion layer P
first section R1
second section G1
first scattering layer B
second scattering layer R2
third scattering layer G2
groove 253, 353
sidewall x
first guiding element 161, 261, 561 second guiding element 163
third guiding element 262
polarization state conversion element 563
second dichroic element 180, 280, 480
light homogenizing device 190
intermediate image A
light-emitting optical path L
first optical path L1
second optical path L2

The present disclosure will be further illustrated by the following specific embodiments in conjunction with the above accompanying drawings.

DESCRIPTION OF EMBODIMENTS

In order to help clearly understand the above objects, features and advantages of the present disclosure, the present disclosure will be described in detail below with reference to the accompanying drawings and specific embodiments. It should be noted that the embodiments of the present disclosure and the features thereof may be combined with each other provided that the combination thereof is not a paradox.

In the following description, many specific details are set forth in order to provide a thorough understanding of the present disclosure. The embodiments described below are merely some of, rather than all of the embodiments of the present disclosure. In view of the embodiments of the present disclosure, all alternate embodiments made by those skilled in the art without any inventive step shall fall within the scope of the present disclosure.

All technical and scientific terms used herein have the same meaning as commonly understood by those skilled in the art, unless otherwise stated. The terms used in the description of the present disclosure are merely for the purpose of describing the specific embodiments, but are not intended to limit the present disclosure.

FIG. 1 is a schematic view of an optical path in the dual-color wheel method. Blue laser light emitted by a laser firstly excites a phosphor by a phosphor wheel 50 to generate fluorescent light, and then is incident on a light modulation device after being filtered by a filter wheel 60, and finally is projected by a lens to generate a projected image. In this method, the phosphor wheel 50 and the filter wheel 60 are synchronized, otherwise display abnormalities would occur. In addition, in this method, a large space would be occupied by the two color wheels, which does not facilitate miniaturization of the projection device.

Figure 2:
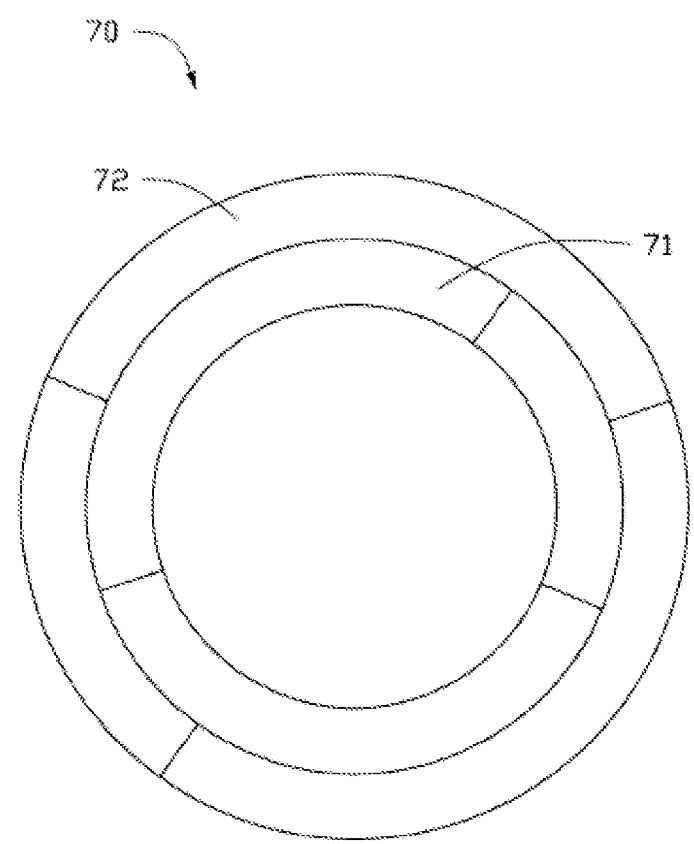
FIG. 2 is a schematic structural top view of a single color wheel formed by combining a phosphor wheel with a filter wheel.

FIG. 2 shows that a phosphor wheel and a filter wheel are combined to a single color wheel, and a color wheel 70 is divided into two circular regions, i.e., a phosphor region 71 and a filter region 72. Blue laser light incident on the phosphor region 71 excites a phosphor to generate fluorescent light, and the fluorescent light propagates along a relay optical path and then is incident on a filter of corresponding color segment, which avoids the synchronization occurred in the dual-color wheel method. However, the color wheel has both the phosphor region and the filter region, which will inevitably lead to increase in a diameter of the color wheel and thus does not facilitate the miniaturization of the projection device.

That applicant found that it is beneficial to reduce a volume of the projection device by moving the filter wheel or the filter region. However, the display effect is poor due to impure fluorescent color.

In a light source system according to embodiments of the present invention, excitation light of excited light which has not been converted by a wavelength conversion device is filtered by a dichroic assembly. Thus, it is beneficial to improve accuracy of colors of light emitted from the light source system, thereby ensuring that display effect of a projection apparatus employing the light source system according to the present disclosure. The dichroic assembly can filter the excitation light of the excited light that has not been converted by the wavelength conversion device, thereby improving color purity of emitted excited light. In the wavelength conversion device, a filter unit for filtering the excited light emitted from the wavelength conversion device is omitted, which is beneficial to reduce a volume of the light source system, and is especially suitable for projection products such as micro-projectors and portable projection devices with high requirement for product volume. A projection apparatus including the light source system according to the present disclosure further includes a control device and a light modulation device, wherein the control device is configured to generate a modulation signal based on image data of an image to be displayed, and the light modulation device is configured to modulate the light emitted from the light source system based on the modulation signal to obtain image light of the image to be displayed.

Figure 3:
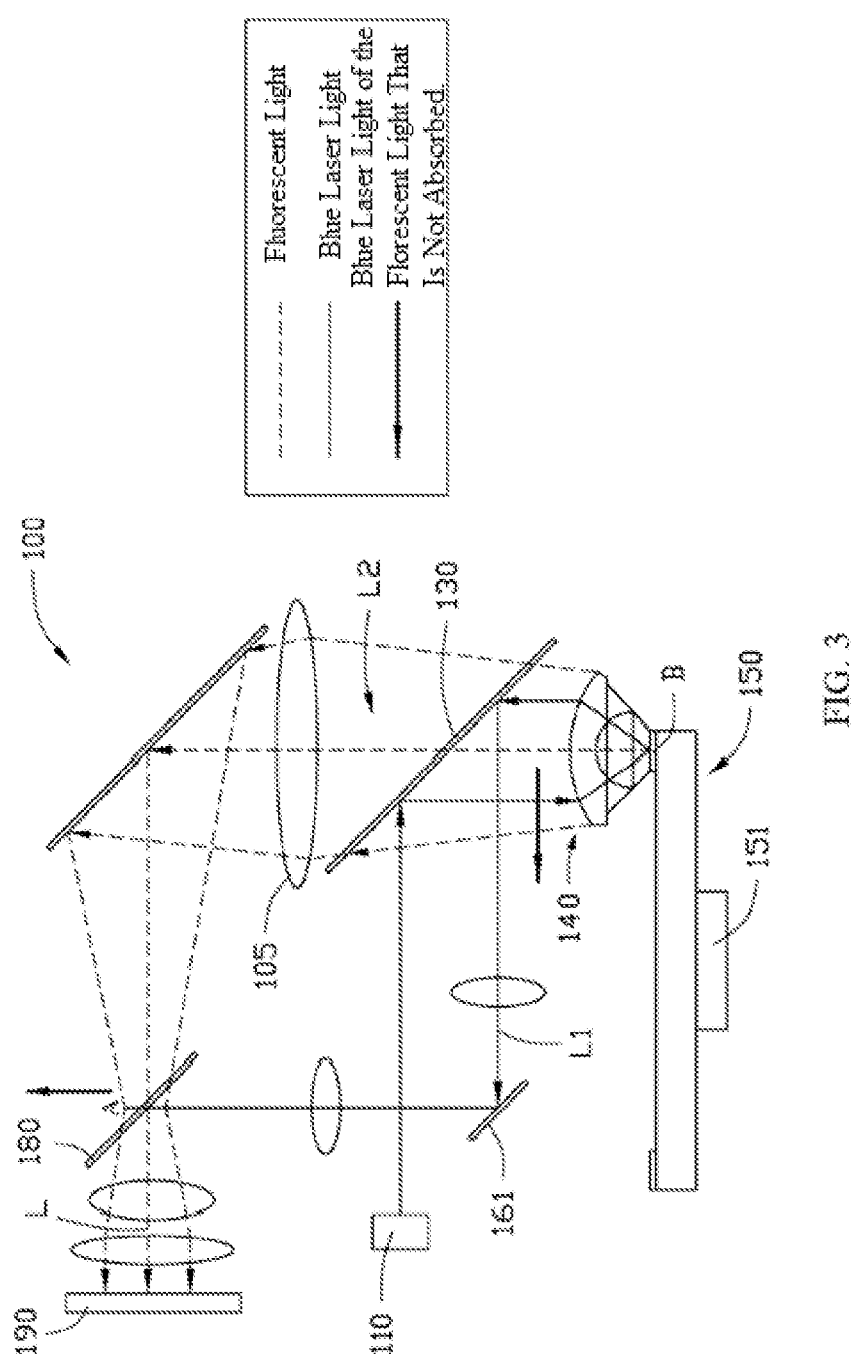
FIG. 3 is a schematic structural view of a light source system according to a first embodiment of the present disclosure.

Referring to FIG. 3, a light source system 100 according to a first embodiment of the present disclosure includes an excitation light source 110, a dichroic assembly and a wavelength conversion device 150. The dichroic assembly includes a first dichroic element 130 and a second dichroic element 180. The excitation light source 110 is configured to emit excitation light. The excitation light is guided by the first dichroic element 130 or other guiding element, and then is incident on a surface of the wavelength conversion device 150. The wavelength conversion device 150 is configured to perform wavelength conversion on at least part of the excitation light to obtain excited light within a predetermined wavelength range and to emit the excited light and unconverted excitation light. The first dichroic element 130 is disposed on an optical path of the excited light emitted from the wavelength conversion device 150 to guide the excited light emitted from the wavelength conversion device 150 to exit from the light source system 100 along a light-emitting optical path L, and to guide at least part of the unconverted excitation light emitted from the wavelength conversion device 150 to be transmitted on a path, which is not the light-emitting optical path L. The unconverted excitation light is guided by the first dichroic element 130 and is consumed when being transmitted in the light source system 100, or the unconverted excitation light is irradiated to and absorbed by a structural element and is then consumed, so that at least the part of the unconverted excitation light cannot be emitted along the light-emitting optical path L, which is beneficial to improve the accuracy of the color of the light emitted from the light source system, thereby ensuring display effect of a projection apparatus employing the light source system according to the present disclosure.

Specifically, the excitation light source 110 may be a blue light source that emits blue excitation light. It should be understood that the excitation light source 110 is not limited to the blue light source, and the excitation light source 110 may be a purple light source or the like. In this embodiment, a light emitter of the excitation light source 110 is composed of blue lasers that are configured to emit blue laser light, which satisfies a Gaussian distribution and is used as the excitation light. It should be understood that the light emitter may include one, two, or more blue laser arrays. The specific number of the lasers may be selected as desired. In one embodiment, the light emitter of the excitation light source 110 is a blue light-emitting diode.

Figure 4:
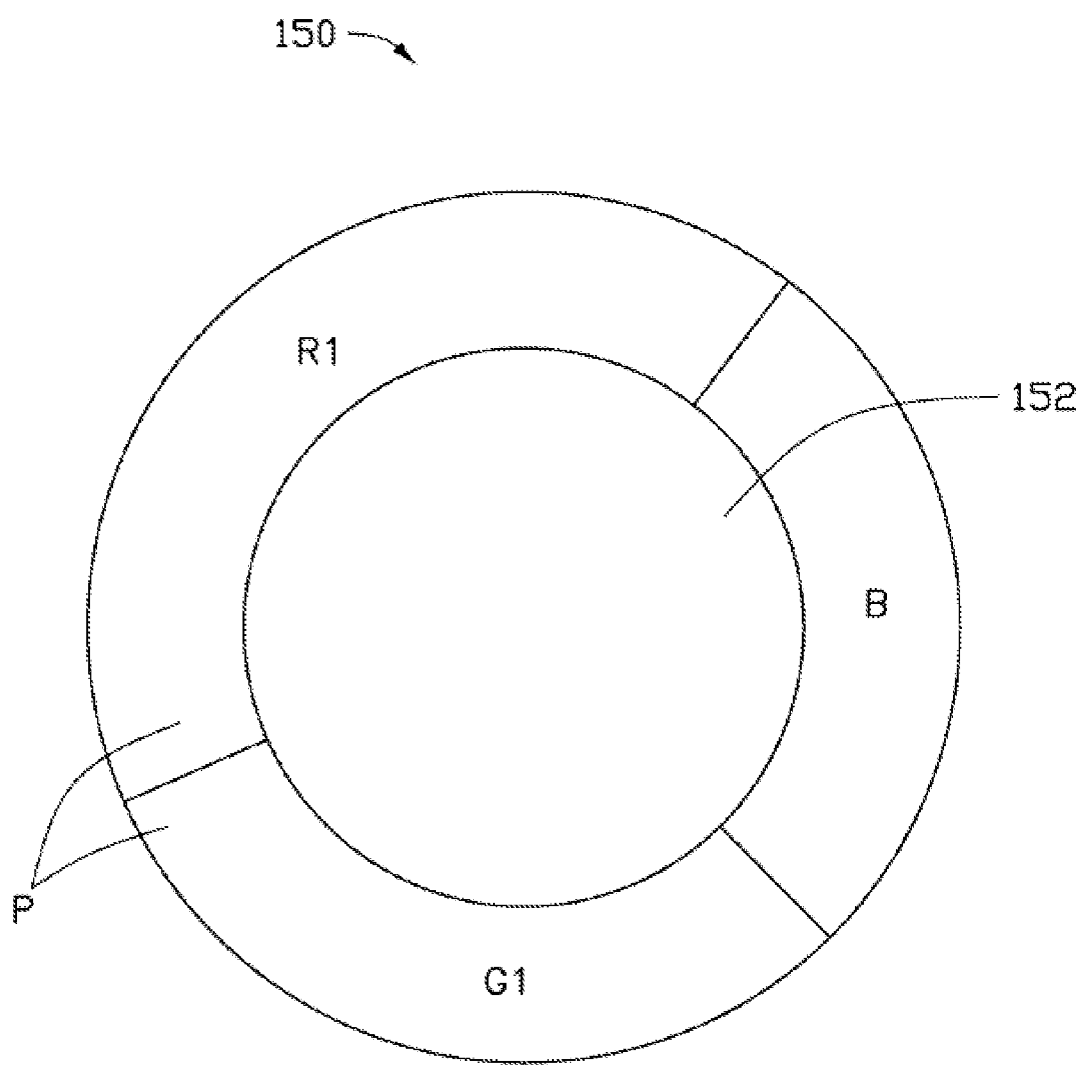
FIG. 4 is a schematic structural top view of a wavelength conversion device shown in FIG. 3.

Referring to FIG. 4 in conjunction with FIG. 3, the wavelength conversion device 150 includes a driving unit 151 and a substrate 152. The driving unit 151 is disposed at a geometric center of a bottom surface of the substrate 152 and is configured to drive the substrate 152 to periodically move.

A surface of the wavelength conversion device 150 is provided with a conversion layer P and a first scattering layer B. The conversion layer P is provided with a wavelength conversion material, such as a phosphor, a phosphorescent material or a quantum dot, to perform wavelength conversion on at least part of the excitation light to obtain the excited light, and to emit the excited light and the unconverted excitation light. The excited light emitted from the conversion layer P satisfies an Lambertian distribution, and the unconverted excitation light also satisfies the Lambertian distribution after being scattered by the wavelength conversion material.

The conversion layer P and the first scattering layer B are alternately located on an optical path of the excitation light under the drive by the driving unit 151. The wavelength conversion device 150 alternately emits the excited light and scattered excitation light, and the unconverted excitation light and the excited light are simultaneously emitted from the surface of the wavelength conversion device 150.

Specifically, the substrate 152 is in a circular shape, and a region formed by the conversion layer P and the first scattering layer B is in a circle ring shape. The conversion layer P may be arranged to be adjacent to or spaced apart from the first scattering layer B, and each of the conversion layer P and the first scattering layer B has a sector-ring shape. The conversion layer P includes a first section R1 and a second section G1, each of which is in a sector-ring shape. Further, the first section R1 and the second section G1 are provided with a first color wavelength conversion material and a second color wavelength conversion material, respectively, which are excited by the excitation light to generate a fluorescent light of a first color and a fluorescent light of a second color as the excited light, respectively. In this embodiment, the first color is red, and the second color is green. In one embodiment, the conversion layer P is further provided with sections of other colors, such as a section for generating a yellow/orange fluorescent light. Alternatively, at least one of the first section R1 or the second section G1 may be replaced with the section for generating the yellow/orange fluorescent light.

The excitation light is guided by the first dichroic element 130 or other guiding element to be incident on the surface of the wavelength conversion device 150 at an incident angle, which is an acute angle. In other words, the excitation light is obliquely incident on the surface of the wavelength conversion device 150. Specifically, a collecting lens group 140 is disposed between the wavelength conversion device 150 and the first dichroic element 130, and is configured to converge the light incident on the surface of the wavelength conversion device 150 and collimate the light emitted from the wavelength conversion device 150. The excitation light emitted from the first dichroic element 130 is emitted from a position deviated from an optical axis of the collecting lens group 140 and incident on the collecting lens group 140, and then is incident on the surface of the wavelength conversion device 150 at an acute angle after being focused by the collecting lens group.

The first scattering layer B is provided with a scattering material to scatter the excitation light and reduce speckle thereof. In the present disclosure, the first scattering layer B scatters the excitation light at a small angle while eliminating the speckle, such that an optical path of excitation light incident on the first scattering layer B is separated from that of the excitation light emitted from the first scattering layer B. For example, as shown in FIG. 3, the optical path of the excitation light incident on the first scattering layer B and the optical path of the excitation light emitted from the first scattering layer B form a V shape, such that the excitation light emitted by the excitation light source 110 and the excitation light emitted from the first scattering layer B are incident on different regions on a surface of the first dichroic element 130. Therefore, the optical paths of two excitation light beams emitted from the first dichroic element 130 do not overlap, thereby simplifying the design of the optical paths and reducing the number of optical components in the light source system 100.

The first dichroic element 130 is disposed between the excitation light source 110 and the wavelength conversion device 150 to transmit the excited light and reflect the excitation light. In this embodiment, the excitation light emitted by the excitation light source 110 is blue laser light that satisfies the Gaussian distribution, and the excited light is red fluorescent light and green fluorescent light that both satisfy the Lambertian distribution. The scattered excitation light is incident on the collecting lens group 140 at a larger divergence angle, and then is collimated by the collecting lens group 140 to be incident on the first dichroic element 130 with a larger beam diameter. The first dichroic element 130 may be a dichroic sheet, which reflects blue light, transmits yellow light, and has a reflectivity for a blue light that is equal to or greater than 99%. The scattered excitation light and the excited light emitted from the first dichroic element 130 are transmitted along a first optical path L1 and a second optical path L2, respectively, and at least part of the unconverted excitation light is transmitted along an optical path, which is not any one of the light-emitting optical path L, the first optical path L1, and the second optical path L2.

When the conversion layer P is located on the optical path of the excitation light, the conversion layer P emits the excited light and the unconverted excitation light. An amount of the unconverted excitation light is small. The unconverted excitation light is greatly consumed in a process during which the unconverted excitation light is guided to the light-emitting optical path L in the optical path structure, or the unconverted excitation light is irradiated to and absorbed by a structural member and then consumed. Therefore, most of the unconverted excitation light will not be emitted from the light source system 100 along with the excited light. Thus, it is beneficial to eliminate influence of the unconverted excitation light on color coordinates of the excited light, and to improve the accuracy of colors of the light emitted from the light source system 100, thereby improving the display effect of the projection apparatus.

As shown in FIG. 3, the light source system 100 further includes a second dichroic element 180 disposed on the light-emitting optical path L. The second dichroic element 180 is configured to guide the excited light to be transmitted along the light-emitting optical path L and emitted from the light source system 100, and to guide the scattered excitation light transmitted along the first optical path L to be transmitted along the light-emitting optical path L and emitted from the light source system 100, and further to guide the unconverted excitation light to be transmitted along an optical path, which is not the light-emitting optical path L, so as to be consumed on the optical path. Accordingly, most of the unconverted excitation light cannot be emitted from the light source system 100 along the light-emitting optical path L.

Specifically, the second dichroic element 180 is configured to combine, in etendue, the scattered excitation light on the first optical path L1 and the excited light on the second optical path L2, such that the excitation light and the excited light emitted from the second dichroic element 180 are emitted from the light source system 100 along the light-emitting optical path L. The second dichroic element 180 is configured to reflect the excitation light and transmit the excited light. In some embodiments, the second dichroic element 180 is a dichroic sheet that reflects blue light, transmits yellow light, and has a reflectivity for a blue light equal to or greater than 99%. An intermediate image A formed by the excited light emitted from the first dichroic element 130 is located at the second dichroic element 180, such that an area of a light spot of the excited light formed on the second dichroic element 180 is equal to an area of the intermediate image A.

In a case where the conversion layer P is located on the optical path of the excitation light, the unconverted excitation light that is not reflected by the first dichroic element 130 is transmitted along the second optical path L2, is incident on a surface of the second dichroic element 180, and is reflected by the second dichroic element 180 with a large consumption after reflection, or the unconverted excitation light is irradiated on the structural member and is absorbed. Therefore, the unconverted excitation light will not be emitted from the light source system 100, which is beneficial to improve the accuracy of the colors of the light emitted from the light source system 100, thereby improving the display effect of the projection apparatus. In a case where the first scattering layer B is located on the optical path of the excitation light, a part of the scattered blue excitation light that is not reflected by the first dichroic element 130 passes through the first dichroic element 130 and is incident on the surface of the second dichroic element 180, and the scattered excitation light on the second optical path L2 is reflected by the second dichroic element 180 with a large consumption, or the scattered excitation light is irradiated on the structural member and is absorbed. Therefore, the scattered excitation light on the second optical path L2 will not be emitted from the light source system 100, which is beneficial to improve uniformity of the emitted excitation light as primary light. That is, after the light on the second optical path L2 is sequentially processed by the first dichroic element 130 and the second dichroic element 180, the excitation light on the second optical path L2 is almost completely reflected by the light splitter and will not be emitted from the light source system 100, which is beneficial to improve the accuracy and uniformity of the colors of the light emitted from the light source system 100, thereby improving the display effect of the projection apparatus.

It should be understood that a first guiding element 161 is further provided on the first optical path L1, and is configured to guide the excitation light emitted from the first dichroic element 130 to be incident on the second dichroic element 180. In this embodiment, the first guiding element 161 is a reflector mirror. A second guiding element 163 is provided on the second optical path L2. The second guiding element 163 is configured to guide the light emitted from the first dichroic element 130 to be incident on the second dichroic element 180. In this embodiment, the second guiding element 163 is a dichroic sheet for reflecting the excited light and transmitting the excitation light or a reflector mirror.

The light source system 100 further includes a light homogenizing device 190 located on the light-emitting optical path L. The light emitted from the second dichroic element 180 is homogenized by the light homogenizing device 190 and then emitted therefrom. The light homogenizing device 190 may be an optical integrator, or a dual fly-eye lens, or other devices. In this embodiment, in order to reduce the volume of the light source system 100, the dual fly-eye lens is used as the light homogenizing device 190 to homogenize light.

Figure 5:
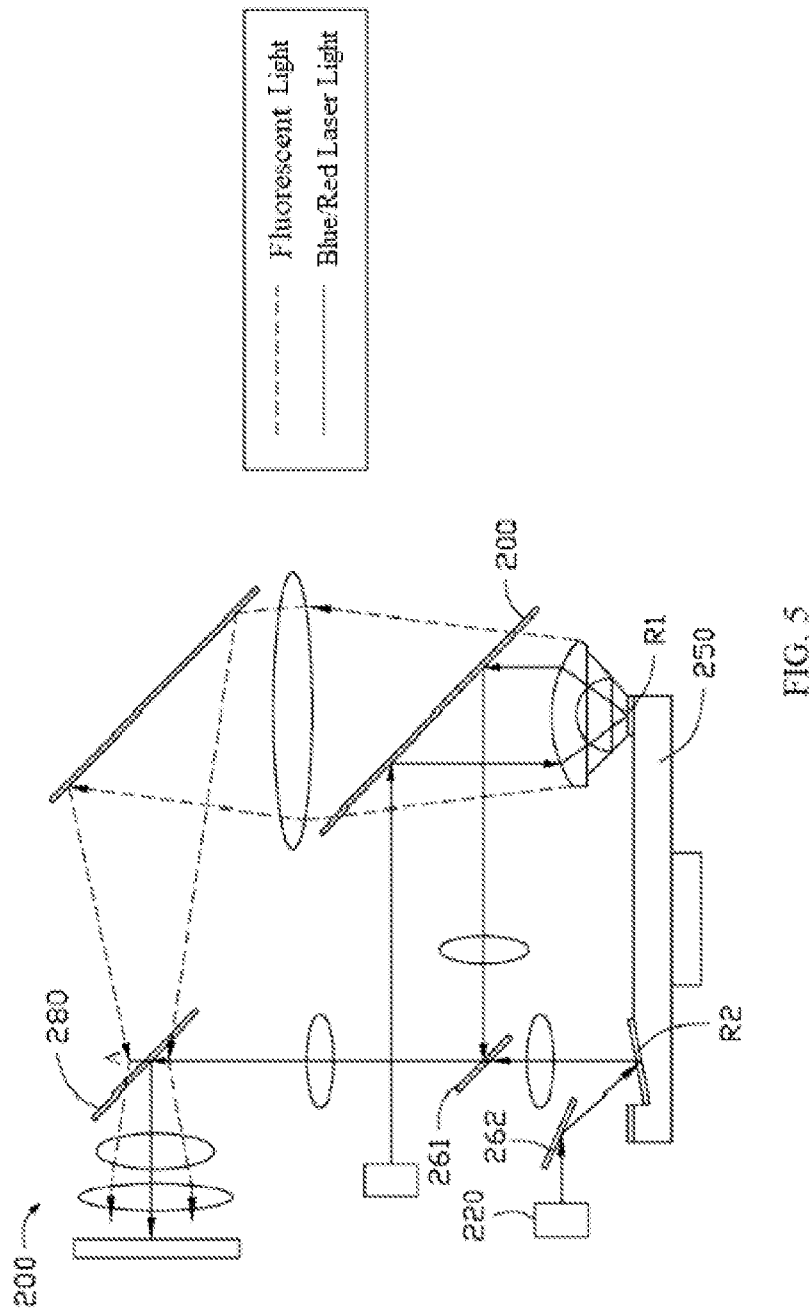
FIG. 5 is a schematic structural view of a light source system according to a second embodiment of the present disclosure.

Referring to FIG. 5, a light source system 200 according to a second embodiment of the present disclosure is mainly different from the light source system 100 in that the light source system 200 further includes a supplemental light source 220 for emitting laser light as supplemental light, and a wavelength conversion device 250 further includes a second scattering layer R2 for scattering and reflecting the supplemental light. The second scattering layer R2 is configured to scatter the incident supplemental light to eliminate or alleviate a speckle effect generated by the laser light. The supplemental light is sequentially guided by the second scattering layer R2 and a first guiding element 261, is combined with the excited light at a second dichroic element 280, and is emitted from the light source system 200 along the same optical path.

Since red fluorescent light generated by the existing red phosphor is not pure and there is no filter unit to modify the red fluorescent light, red display effect is not good enough. In this embodiment, the supplemental light source 220 can emit the light from the light source system 200 without wavelength conversion by the wavelength conversion device 250, thereby improving a color gamut covered by light of a primary color emitted from the light source system 200 and the display effect. In some embodiments, a light emitter of the supplemental light source 220 is a laser for emitting laser light of a first color (such as, red) as the supplemental light. The laser light of the first color and the fluorescent light of the first color are metameric light. Specifically, the laser light of the first color has a narrower spectral bandwidth, a higher color purity saturation, and a larger coverage color gamut. Further, the fluorescent light of the first color has a wider spectral bandwidth, lower color impurity saturation, and a smaller coverage color gamut. Thus, it is beneficial to expand the color gamut range of the light source system 200 by combining the fluorescent light of the first color and the laser light of the first color and emitting them from the light source system 200. In this embodiment, the red fluorescent light is added with red laser light to combining the red fluorescent light and the red laser light, thereby improving the display effect of the red light.

Figure 6A:
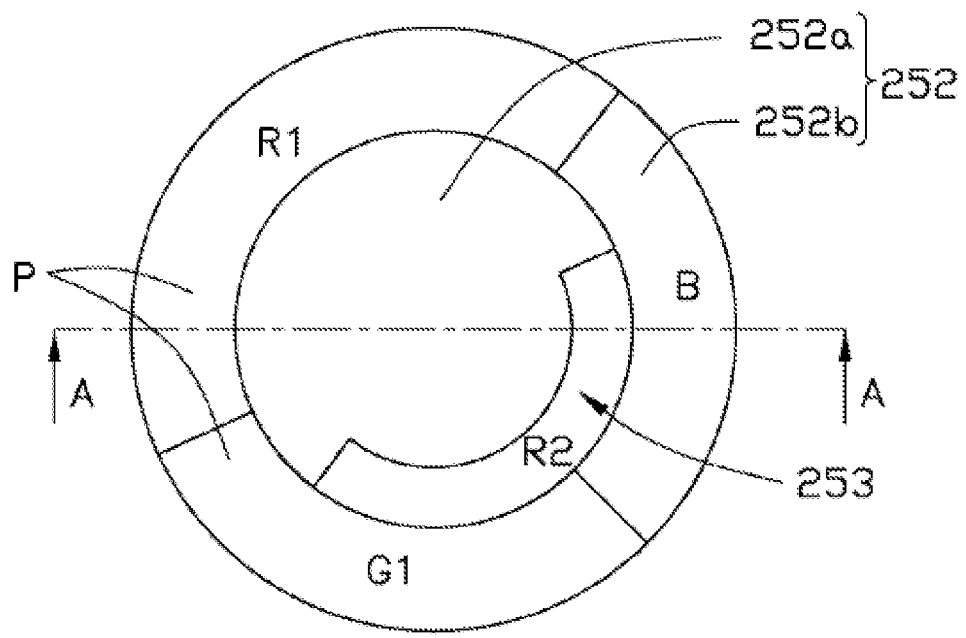
FIG. 6A is a schematic structural top view of a wavelength conversion device shown in FIG. 5.
Figure 6B:
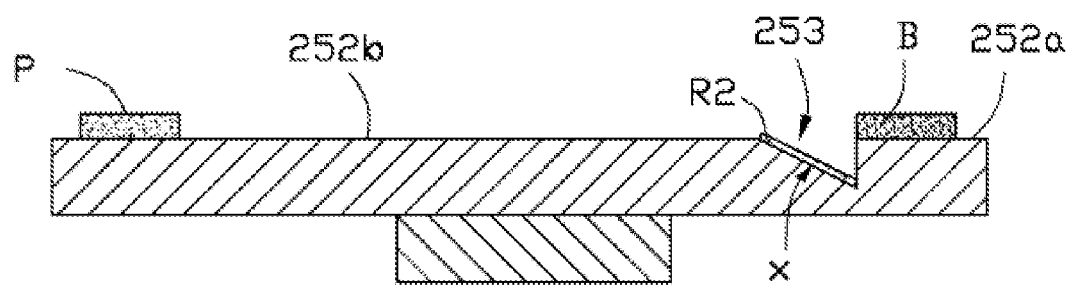
FIG. 6B is a schematic structural sectional view of the wavelength conversion device shown in FIG. 5 along the line A-A.

Referring to FIGS. 6A and 6B in conjunction with FIG. 5, a conversion layer P and a first scattering layer B of the wavelength conversion device 250 are both disposed on a substrate 252. The conversion layer P includes a first section R1 for generating the fluorescent light of the first color as the excited light when being excited by the excitation light. The second scattering layer R2 and the first section R1 are symmetrically arranged about the geometric center of the substrate. That is, on the circular substrate 252, central angles occupied by the second scattering layer R2 and the first section R1 are vertical angles, so that the excited light and the supplemental light can be simultaneously emitted from the wavelength conversion device 250. It should be understood that a position of the second scattering layer R2 on the substrate 252 may be flexibly set based on an incident position of the supplemental light.

The substrate 252 includes a first region 252a and a second area 252b arranged adjacent to each other on a surface thereof. As shown in the figure, the first region 252a is annularly arranged on an edge of the substrate 252, and the second region 252b is arranged inside the first region 252a. In one embodiment, the first region 252a and the second region 252b may be exchanged in position. The first region 252a and the second region 252b may be arranged adjacent to or spaced apart from each other. The conversion layer P and the first scattering layer B are both disposed in the first region 252a. In addition, the substrate 252 is provided with a groove 253 in the second region 252b, and the second scattering layer R2 is disposed on a surface of a sidewall x of the groove 253. In this embodiment, the groove 253 is a V-shaped groove, and an acute angle is formed between the sidewall x and a plane of the first region 252a, which is beneficial to miniaturization design of a product and the assembly thereof.

It should be understood that the light source system 200 further includes essential elements for guiding the supplemental light to be incident on the second scattering layer R2, such as a third guiding element 262 shown in FIG. 5. In some embodiments, the third guiding element 262 is a reflector mirror.

Further, the first guiding element 261 is configured to reflect the excitation light emitted from a first dichroic element 230 and transmit the supplemental light emitted from the second scattering layer R2. For example, the first guiding element 261 may be a dichroic sheet for reflecting blue light and transmitting red light.

Figure 7:
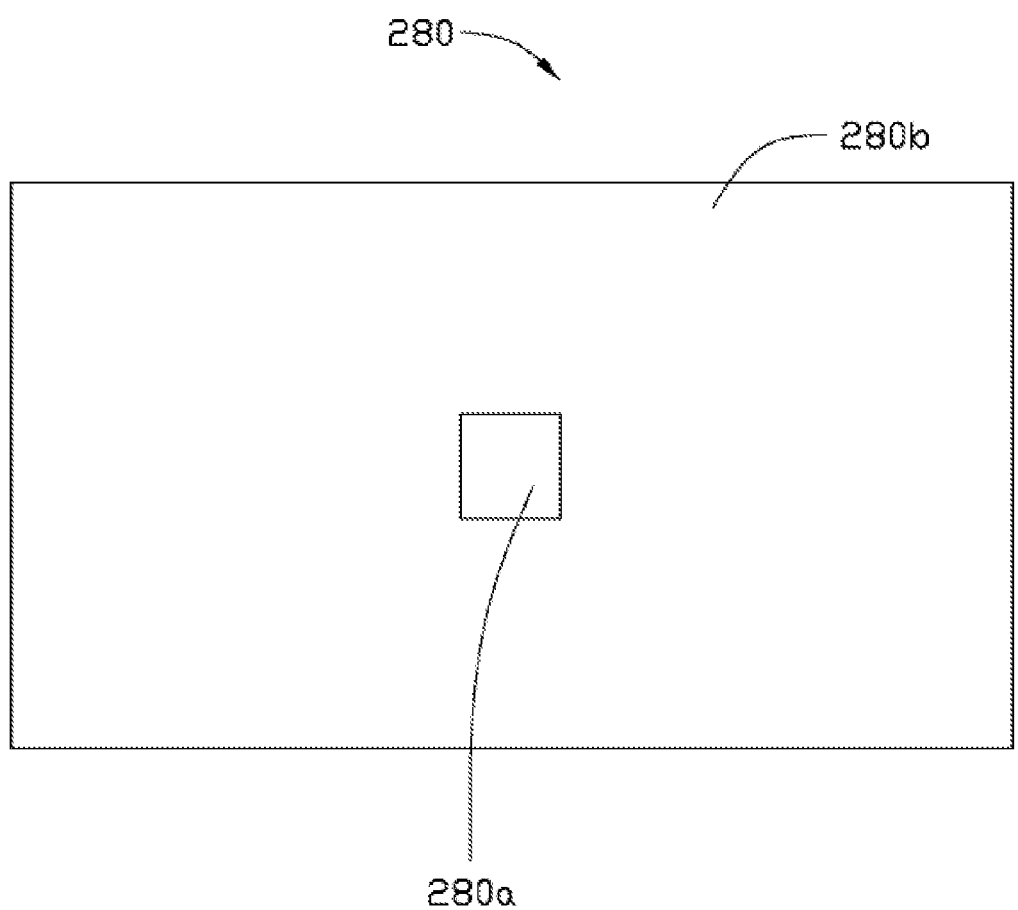
FIG. 7 is a schematic structural top view of a second dichroic element shown in FIG. 5.

Referring to FIG. 7 in conjunction with FIG. 5, a second dichroic element 280 of the light source system 200 includes a central region 280a and an edge region 280b. The central region 280a is configured to reflect the excitation light and the supplemental light, and the edge region 280b is configured to reflect the excitation light and transmit the excited light. In this embodiment, the central region 280a may be provided with an optical film that reflects red light and blue light and transmits light of other colors. For example, the optical film may reflect the red light and the blue light within wavelength bands of the excitation light and the supplemental light and transmit light within other wavelength bands, so that a part of the excited light may be transmitted through the central region 208a to be utilized, thereby improving light efficiency. In one embodiment, the central region 280a may be a reflective film, and the edge region 280b may be provided with a film sheet for reflecting blue light and transmitting yellow light. It should be understood that the central region 280a is not limited to being arranged at the geometric center of the second dichroic element 280, and may be arranged at an eccentric position or a peripheral region of the second dichroic element 280. In addition, the edge region 280b may be arranged at the geometric center or an eccentric position of the second dichroic element 280.

Figure 8:
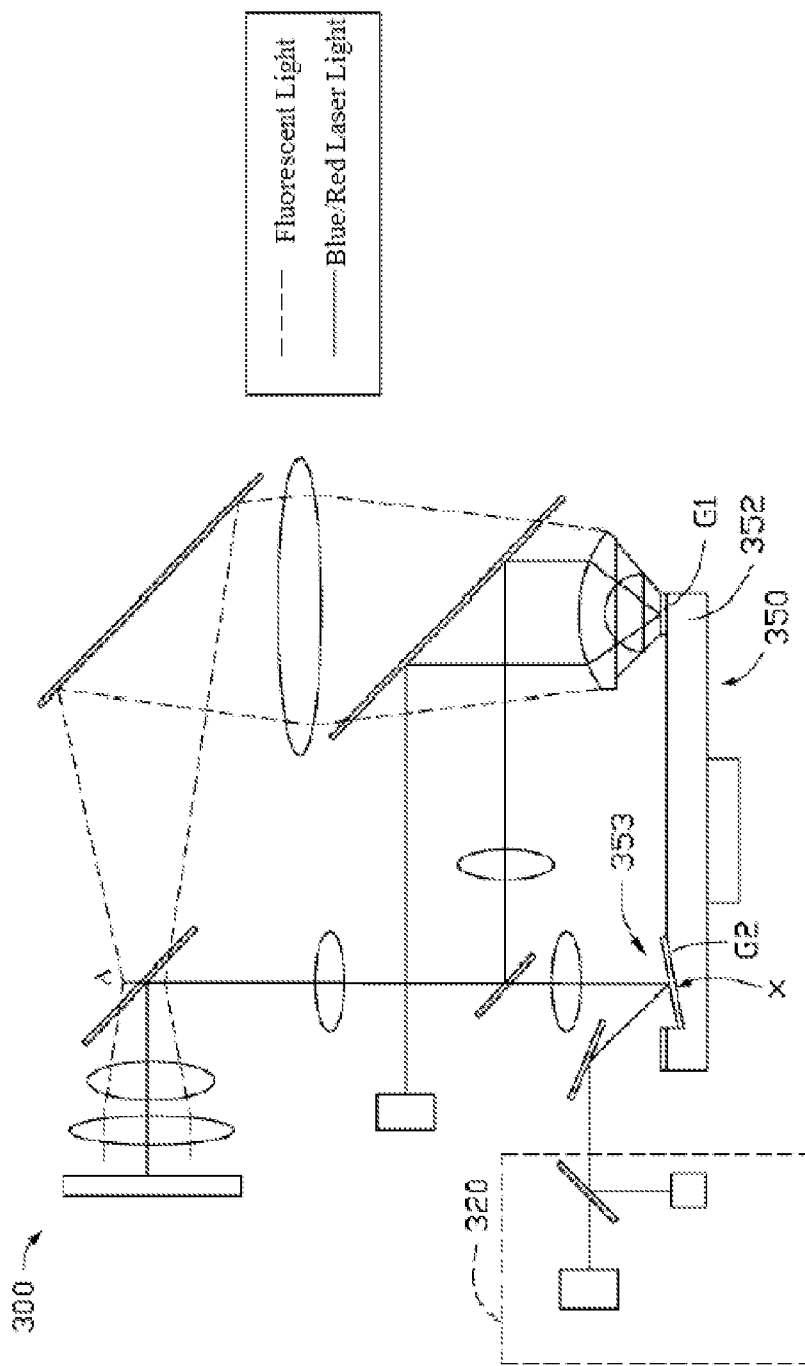
FIG. 8 is a schematic structural view of a light source system according to a third embodiment of the present disclosure.
Figure 9:
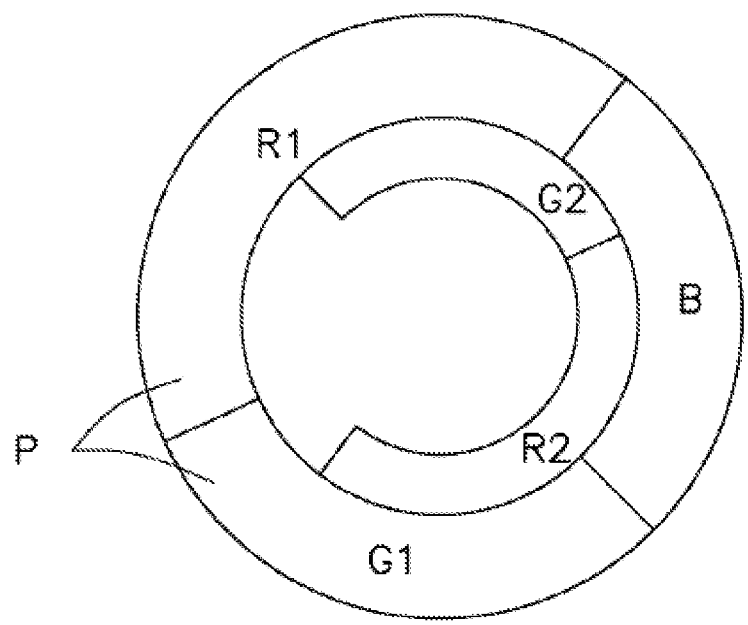
FIG. 9 is a schematic structural top view of a wavelength conversion device shown in FIG. 8.

Referring to FIGS. 8 and 9, a light source system 300 according to a third embodiment of the present disclosure is mainly different from the light source system 200 in that the supplemental light source 320 further includes a green laser for emitting a laser light of a second color as the supplemental light. The supplemental light source 320 is configured to emit the laser light of the first color and the laser light of the second color in a time sequence. It should be understood that in the supplemental light source 320, a dichroic sheet for reflecting red light and transmitting green light or a dichroic sheet for reflecting green light and transmitting red light may be employed to combine red laser light and green laser light. The sidewall x of the groove 353 in the substrate 352 is further provided with a third scattering layer G2 for scattering the laser light of the second color. The laser light of the second color and the fluorescent light of the second color are metameric light. The second section G1 and the third scattering layer G2 are symmetrically arranged about a geometric center of the substrate 352. That is, on the circular substrate 352, central angles occupied by the second section G1 and the third scattering layer G2 are vertical angles. The laser light of the second color and the laser light of the first color are incident on a surface of a wavelength conversion device 350 along the same optical path, so that a color gamut of light of a green primary color can be expanded by the light source system 300, which is beneficial to improve the display quality of the projection apparatus.

Figure 10:
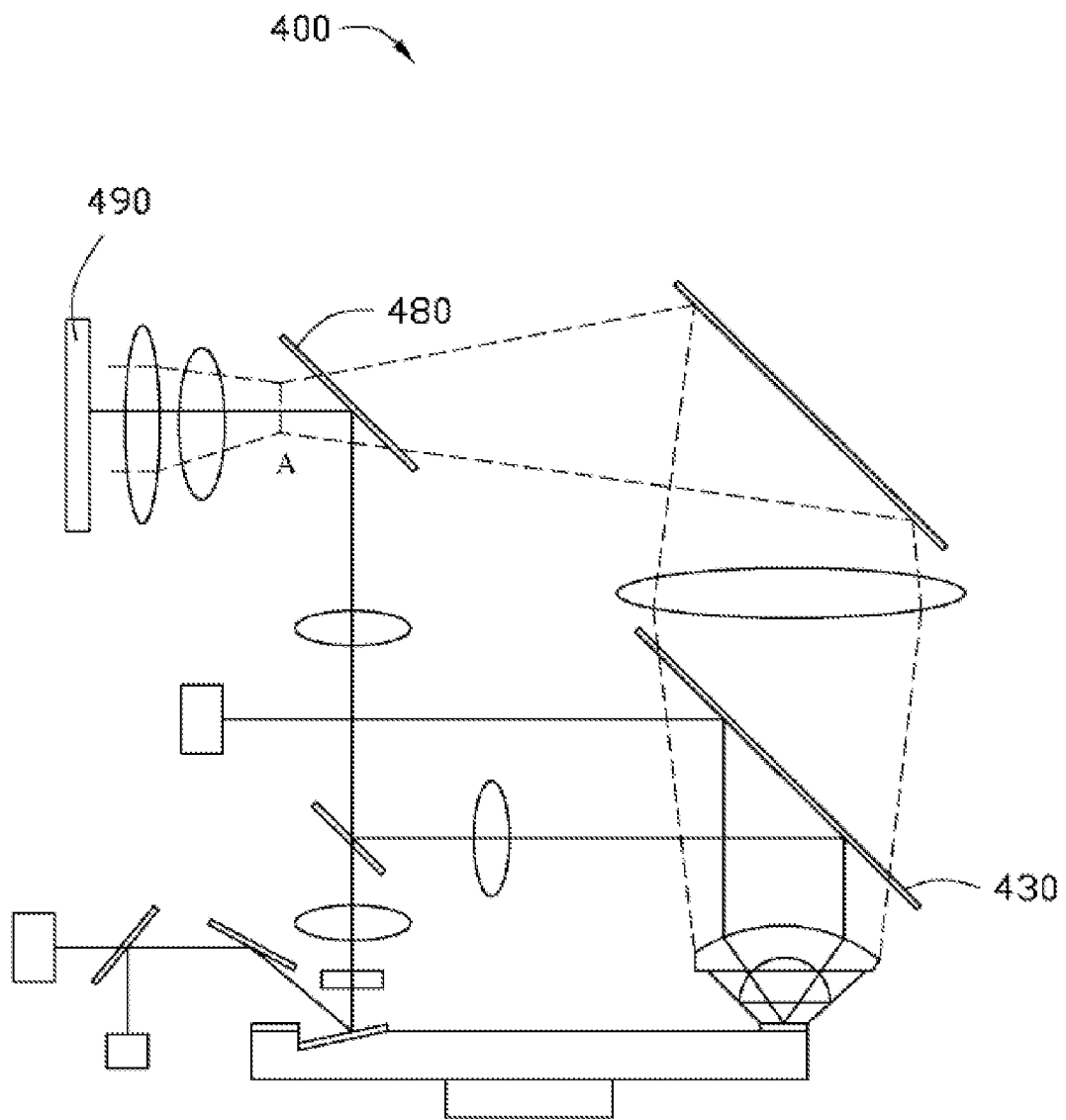
FIG. 10 is a schematic structural view of a light source system according to a fourth embodiment of the present disclosure.

Referring to FIG. 10, a light source system 400 according to a fourth embodiment of the present disclosure is mainly different from the light source system 300 in that the intermediate image A formed by the laser light emitted from a first dichroic element 430 is located between a second dichroic element 480 and a light homogenizing device 490, such that an area of a light spot of the excited light formed on the second dichroic element 480 is greater than that of the intermediate image A. When an area of the central region (not shown) of the second dichroic element 480 and a surface area of the second dichroic element 480 are determined, an amount of the excited light incident on the central region (not shown) of the second dichroic element 480 is relatively reduced, which is beneficial to reduce the light loss of the excited light in the central region and improve the light efficiency and brightness of the system.

Figure 11:
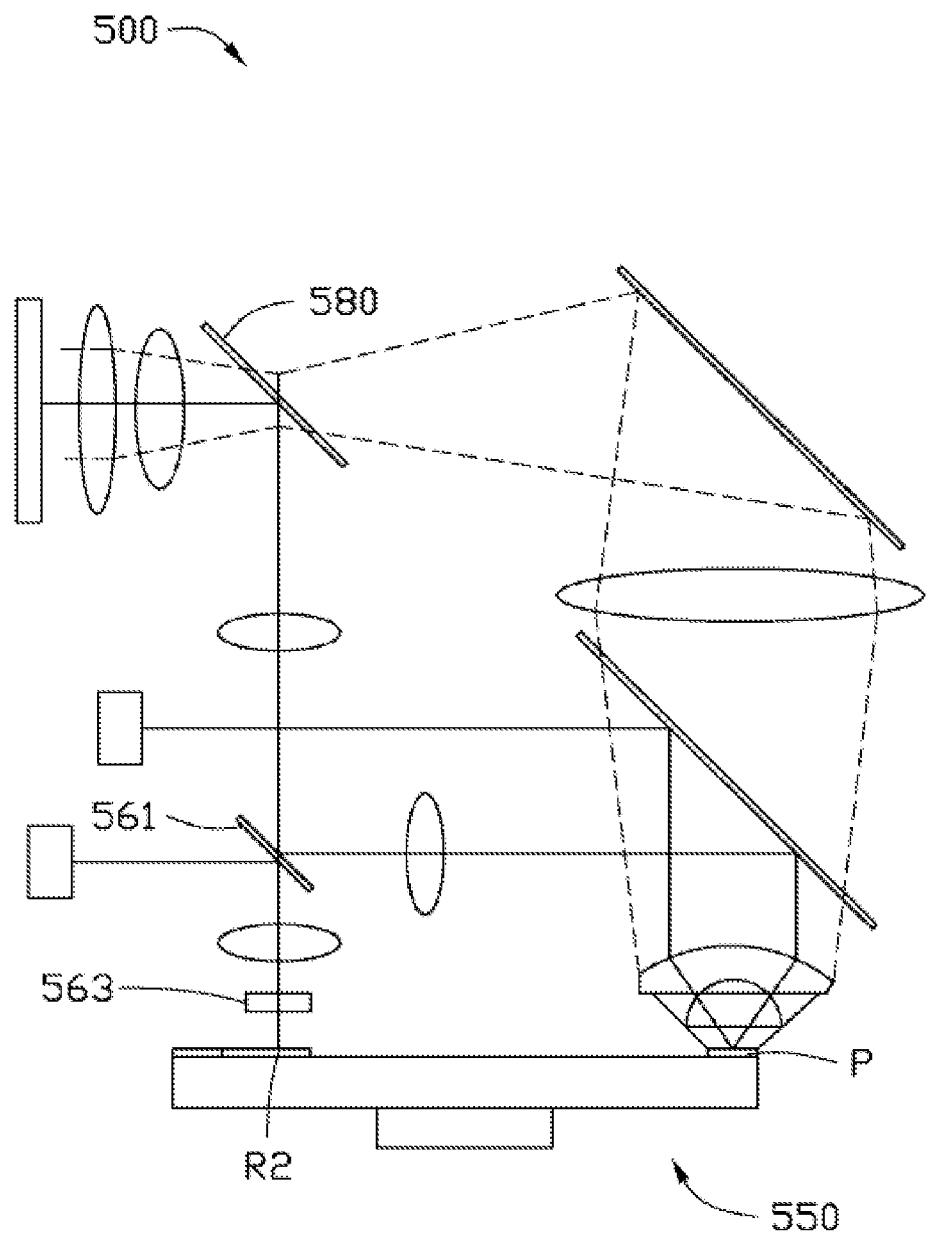
FIG. 11 is a schematic structural view of a light source system according to a fifth embodiment of the present disclosure.

Referring to FIG. 11, a light source system 500 according to a fifth embodiment of the present disclosure is mainly different from the light source system 200 in that the excitation light and the supplemental light are both light in a first polarization state. The first guiding element 561 is configured to reflect the light in the first polarization state and transmit light in a second polarization state. A polarization state conversion element 563 is further disposed between the first guiding element 561 and the wavelength conversion device 550. The supplemental light sequentially passes through the first guiding element 561 and the polarization state conversion element 563, and then is incident on the second scattering layer R2. The supplemental light is reflected and scattered by the second scattering layer R2, and then passes through the polarization state conversion element 563 to obtain supplemental light in the second polarization state. The supplemental light in the second polarization state passes through the first guiding element 561 and then is incident on the second dichroic element 580.

In this embodiment, the first polarization state is an S polarization state, and the second polarization state is a P polarization state. In other embodiments, the first polarization state may be the P polarization state, and the second polarization state may be the S polarization state.

The polarization state conversion element 563 is configured to convert the polarization state of the supplemental light, and may be a quarter-wave plate. In a case where the supplemental light is P-polarized light and the supplemental light is perpendicularly incident on the quarter-wave plate, the quarter-wave plate converts the supplemental light from the P-polarized light into circularly-polarized light. The circularly-polarized supplemental light is reflected and scattered by the second scattering layer R2, and then is converted to be in the P polarization state after being perpendicularly incident on the quarter-wave plate again.

In this embodiment, the first guiding element 561 may selectively polarize the second dichroic element such as a polarization beam splitter (PBS) to reflect S-polarized light and transmit the P-polarized light. In one embodiment, either of the first scattering layer B and the second scattering layer R2 may not change the polarization state of the incident laser light with eliminating the speckle of the laser light. In one embodiment, the first scattering layer B may change the polarization state of the incident excitation light, such that one part of the blue excitation light scattered by the first scattering layer B is changed to be in the P polarization state, and another part of the blue excitation light is maintained in the S polarization state. The excitation light in the S polarization state is guided to the second dichroic element 580 by the first guiding element 561 and is emitted from the light source system 500. The excitation light in the P polarization state is transmitted through the first guiding element 561, instead of being utilized. Since the blue light has a limited effect on improvement of brightness of a displayed image, reducing an amount of the emitted blue light has little effect on the quality of the projection image.

Figure 12A:
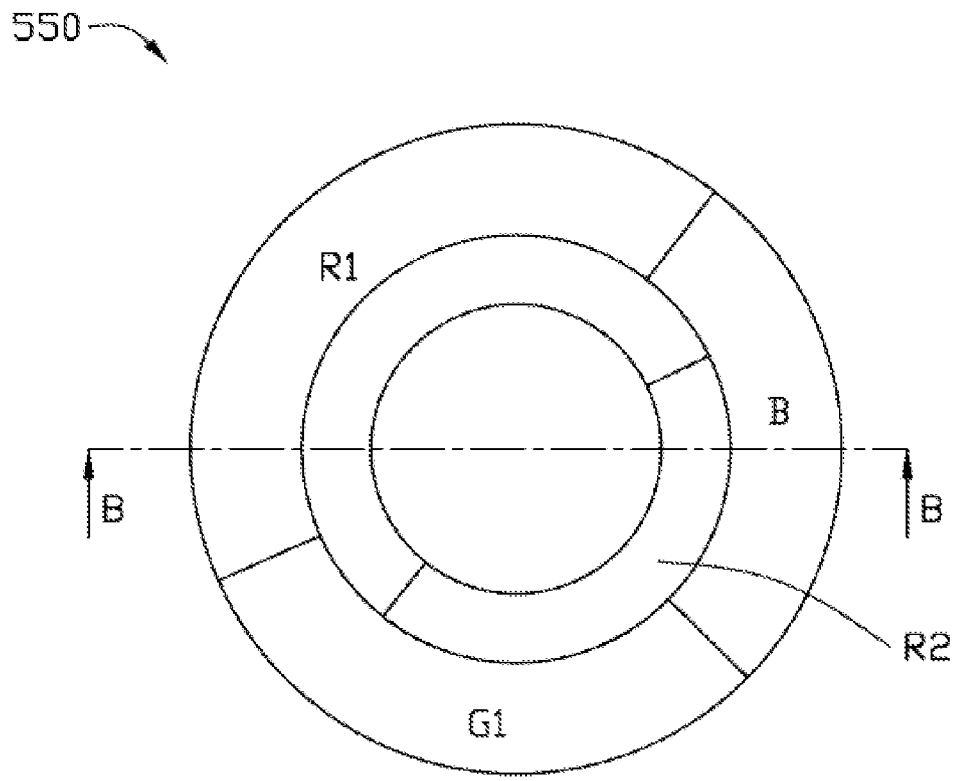
FIG. 12A is a schematic structural top view of a wavelength conversion device shown in FIG. 11.
Figure 12B:
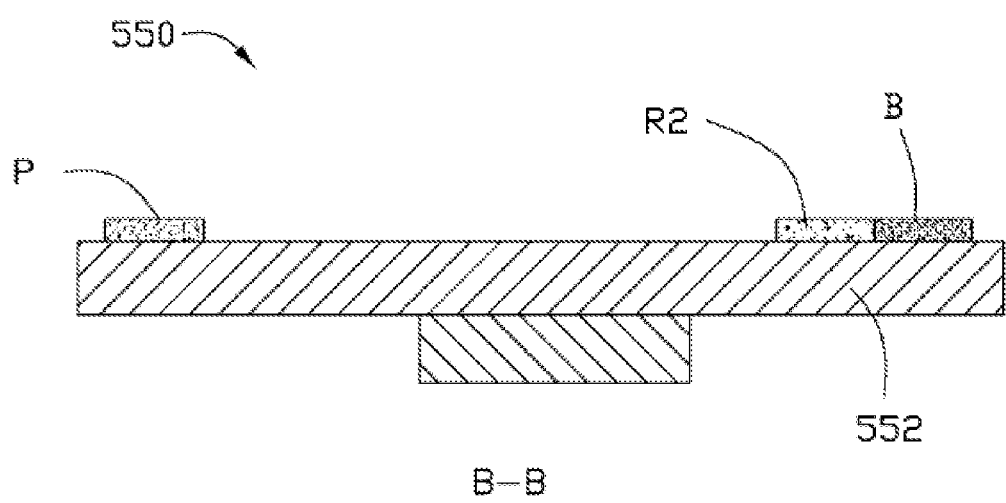
FIG. 12B is a schematic structural view of the wavelength conversion device shown in FIG. 11 along the line B-B.

Referring to FIGS. 12A and 12B, the wavelength conversion device 550 of the light source system 500 is mainly different from the wavelength conversion device 250 in that the wavelength conversion device 550 is not formed with the groove, and the second scattering layer R2 is disposed on the surface of the substrate 552. That is, the second scattering layer R2 and the first scattering layer B are located on the same plane to ensure that the supplemental light is perpendicularly incident on the polarization state conversion element 563 and the design of the optical path is simple. Further, the first scattering layer B and the second scattering layer R2 are arranged side by side, and the first scattering layer B and the second scattering layer R2 may be arranged to be adjacent to or spaced apart from each other.

It should be noted that, the specific solutions applicable to each of the embodiments may also be applicable to each other within the scope of the spirit and essential features of the present disclosure, and detailed description thereof is omitted for brevity and avoiding redundancy.

It is obvious for those skilled in the art that the present disclosure is not limited to the details of the exemplary embodiments as described above, and the present disclosure can be implemented in other specific forms without departing from the spirit or essential features of the present disclosure. Therefore, the embodiments should be regarded as exemplary and non-limiting. The scope of the present disclosure is defined by the appended claims, rather than the description as described above. Therefore, it is intended that all the modifications and/or changes within the meaning and scope of the equivalent elements in the claims shall fall within the present disclosure. Any one of reference numerals in the claims should not be regarded as limiting the claims. In addition, it is obvious that the word such as "including" or "comprising" does not exclude other units or steps, and a singular form does not exclude a plural form. A plurality of devices recited in the device claims may also be implemented through software or hardware by the same device or system. Words such as "first" and "second" are used to denote terms, rather than denoting any specific order.

Finally, it should be noted that the above embodiments are merely used to illustrate the technical solutions of the present disclosure, and are not to limit the present disclosure. Although the present disclosure has been described in detail with reference to some embodiments, it should be understood by those skilled in the art that modifications or equivalent replacements can be made to the technical solutions of the present disclosure without departing from the spirit and scope thereof.

What is claimed is:

1. A light source system, comprising:
an excitation light source configured to emit excitation light;
a wavelength conversion device provided with a conversion layer, wherein the conversion layer is configured to perform wavelength conversion on at least part of the excitation light to obtain excited light and to emit the excited light and unconverted excitation light of the excitation light; and
a dichroic assembly configured to guide the excited light emitted from the conversion layer to propagate along a second optical path, so that the excited light exits the light source system along a light-emitting optical path, wherein the dichroic assembly is also configured to guide the at least part of the unconverted excitation light emitted by the conversion layer to exit the light source system along an optical path, which is not the light-emitting optical path,
wherein the dichroic assembly comprises a first dichroic element and a second dichroic element;
wherein the wavelength conversion device further comprises:
a first scattering layer, wherein the first scattering layer and the conversion layer are alternately located on an optical path of the excitation light; and
wherein the first scattering layer is configured to reflect and scatter the excitation light to obtain scattered excitation light, and the scattered excitation light is guided by the first dichroic element to propagate along a first optical path, which is not the second optical path, and then is guided by the second dichroic element to be emitted from the light source system along the light-emitting optical path.

2. The light source system according to claim 1, wherein the excitation light is guided by the first dichroic element and then is incident on a surface of the wavelength conversion device at an acute angle, and an optical path of the excitation light incident on the first scattering layer is separated from an optical path of the excitation light emitted from the first scattering layer.

3. The light source system according to claim 2, wherein the second dichroic element is configured to guide the excited light emitted from the first dichroic element to be transmitted along the light-emitting optical path, and is configured to guide the unconverted excitation light emitted from the first dichroic element to be transmitted along the optical path different from the light-emitting optical path.

4. The light source system according to claim 3, wherein the second dichroic element is further configured to guide the scattered excitation light to be transmitted along the light-emitting optical path.

5. The light source system according to claim 4, further comprising:
a first guiding element configured to guide the scattered excitation light emitted from the first dichroic element to be incident on the second dichroic element.

6. The light source system according to claim 5, further comprising:
a supplement light source configured to emit laser light as supplement light,
wherein the wavelength conversion device further comprises a second scattering layer configured to scatter and reflect the supplement light; and
the supplement light is sequentially guided by the second scattering layer and the first guiding element, combined with the excited light at the second dichroic element, and emitted from the light source system along the light-emitting optical path.

7. The light source system according to claim 6, wherein the second dichroic element comprises a central region and an edge region, the central region is configured to reflect the excitation light and the supplement light, and the edge region is configured to reflect the excitation light and transmit the excited light; and
the first guiding element is configured to reflect the excitation light and transmit the supplement light.

8. The light source system according to claim 7, wherein the supplement light comprises laser light of a first color, wherein the wavelength conversion device comprises a substrate on which the conversion layer and the first scattering layer are both disposed, and the conversion layer comprises a first section that is configured to generate fluorescent light of the first color as the excited light under excitation of the excitation light, wherein the laser light of the first color and the fluorescent light of the first color are metameric light, and the second scattering layer and the first section are symmetrically arranged about a geometric center of the substrate.

9. The light source system according to claim 8, wherein a surface of the substrate comprises a first region and a second region, and the conversion layer and the first scattering layer are both disposed in the first region; and
the substrate is provided with a groove in the second region, and the second scattering layer is disposed at a sidewall surface of the groove.

10. The light source system according to claim 9, wherein the supplement light further comprises laser light of a second color, and is configured to emit the laser light of the first color and the laser light of the second color in a time sequence;
the conversion layer further comprises a second section that is configured to generate fluorescence light of the second color as the excited light under the excitation of the excitation light, and the laser light of the second color and the fluorescence light of the second color are metameric light; and
a sidewall surface of the groove is further provided with a third scattering layer configured to scatter the laser light of the second color, and the second section and the third scattering layer are symmetrically arranged about the geometric center of the substrate.

11. The light source system according to claim 2, wherein the first scattering layer is configured to scatter the excitation light at a small angle while eliminating the speckle, such that the excitation light emitted by the excitation light source and the excitation light emitted from the first scattering layer are incident on different regions on a surface of the first dichroic element, and optical paths of two excitation light beams emitted from the first dichroic element do not overlap.

12. The light source system according to claim 6, wherein the excitation light and the supplement light are both light in a first polarization state, the first guiding element is configured to reflect the light in the first polarization state and transmit light in a second polarization state, and a polarization state conversion element is disposed between the first guiding element and the wavelength conversion device; and
the supplementary light sequentially passes through the first guiding element and the polarization state conversion element and then is incident on the second scattering layer, wherein the supplementary light passes through the polarization state conversion element again after being reflected and scattered by the second scattering layer, to obtain supplementary light in the second polarization state, and the supplementary light in the second polarization state passes through the first guiding element and then is incident on the second dichroic element.

13. The light source system according to claim 12, wherein the first scattering layer and the second scattering layer are arranged on a same plane.

14. The light source system according to claim 13, wherein the first scattering layer and the second scattering layer are arranged in any one form of being side by side, adjacent to each other, and spaced apart from each other.

15. The light source system according to claim 1, wherein an intermediate image formed by the excited light emitted from the first dichroic element is located at the second dichroic element.

16. The light source system according to claim 1, further comprising:
a light homogenizing device configured to homogenize light emitted from the second dichroic element, wherein an intermediate image formed by the excited light emitted from the first dichroic element is located between the second dichroic element and the light homogenizing device.

17. The light source system according to claim 16, wherein an area of a light spot of the excited light formed on the second dichroic element is greater than an area of the intermediate image.

18. The light source system according to claim 1, wherein the second dichroic element is configured to combine, in etendue, the scattered excitation light on the first optical path and the excited light on the second optical path.

19. A projection apparatus comprising a light source system, the light source system comprising:
an excitation light source configured to emit excitation light;
a wavelength conversion device provided with a conversion layer, wherein the conversion layer is configured to perform wavelength conversion on at least part of the excitation light to obtain excited light and to emit the excited light and unconverted excitation light of the excitation light; and
a dichroic assembly configured to guide the excited light emitted from the conversion layer to propagate along a second optical path, so that the excited light exits the light source system along a light-emitting optical path, wherein the dichroic assembly is also configured to guide the at least part of the unconverted excitation light emitted by the conversion layer to exit the light source system along an optical path, which is not the light-emitting optical path,
wherein the dichroic assembly comprises a first dichroic element and a second dichroic element;
wherein the wavelength conversion device further comprises:
a first scattering layer, wherein the first scattering layer and the conversion layer are alternately located on an optical path of the excitation light; and
wherein the first scattering layer is configured to reflect and scatter the excitation light to obtain scattered excitation light, and the scattered excitation light is guided by the first dichroic element to propagate along a first optical path, which is not the second optical path, and then is guided by the second dichroic element to be emitted from the light source system along the light-emitting optical path.

* * * * *